United States Patent
Ashley et al.

(10) Patent No.: US 9,355,477 B2
(45) Date of Patent: May 31, 2016

(54) HISTORICAL ALARM ANALYSIS APPARATUS AND METHOD

(75) Inventors: Craig Stuart Ashley, Lane Cove (AU);
David Barry Granatelli, Lilyfield (AU);
Joseph Cho Hei Cheung, Sydney (AU);
Donald Maxwell Shepherd, Epping (AU); Robert Andrew Weiss, Blackburn (AU); Benjamin Ivan Schultz, Artarmon (AU)

(73) Assignee: Honeywell International Inc., Morris Plains, NJ (US)

( * ) Notice: Subject to any disclaimer, the term of this patent is extended or adjusted under 35 U.S.C. 154(b) by 114 days.

(21) Appl. No.: 13/170,833

(22) Filed: Jun. 28, 2011

(65) Prior Publication Data
US 2013/0002697 A1 Jan. 3, 2013

(51) Int. Cl.
*G06T 11/20* (2006.01)
*G05B 23/02* (2006.01)
*G06F 11/32* (2006.01)
*G06F 3/0484* (2013.01)

(52) U.S. Cl.
CPC .......... *G06T 11/206* (2013.01); *G05B 23/0272* (2013.01); *G06F 11/32* (2013.01); *G06F 11/327* (2013.01); *G05B 2219/31469* (2013.01); *G06F 3/04842* (2013.01)

(58) Field of Classification Search
CPC .... G06T 11/206; G01R 13/405; G01R 13/00; G09G 1/162; G06F 11/32; G06F 11/321; G06F 11/322; G06F 11/323; G06F 11/324; G06F 11/326; G06F 11/327; G06F 11/328
USPC .................................. 345/400; 340/506, 517
See application file for complete search history.

(56) References Cited

U.S. PATENT DOCUMENTS

| | | | |
|---|---|---|---|
| 5,287,390 A | | 2/1994 | Scarola et al. |
| 5,353,315 A | * | 10/1994 | Scarola et al. ................ 376/259 |
| 5,581,242 A | | 12/1996 | Arita et al. |

(Continued)

FOREIGN PATENT DOCUMENTS

| | | |
|---|---|---|
| EP | 0 959 398 A1 | 11/1999 |
| EP | 0 906 629 B1 | 2/2003 |

(Continued)

OTHER PUBLICATIONS

Colombe, Jeffrey B., and Gregory Stephens. "Statistical profiling and visualization for detection of malicious insider attacks on computer networks." Proceedings of the 2004 ACM workshop on Visualization and data mining for computer security. ACM, 2004.*

(Continued)

*Primary Examiner* — Ming Hon
*Assistant Examiner* — Sarah Le

(57) ABSTRACT

A method includes partitioning alarms into two or more alarm groups. The alarms are associated with operation of an industrial process system performing a process, and each alarm has multiple states. The method also includes generating a graphical display for presentation to a user. The graphical display identifies at least one of the alarm groups and multiple alarm indicators. Each alarm indicator indicates a state transition of an associated alarm between two of the alarm's states. The alarm indicators are arranged in the graphical display based on times of their respective state transitions.

19 Claims, 4 Drawing Sheets

(56) References Cited

U.S. PATENT DOCUMENTS

| | | | |
|---|---|---|---|
| 5,617,311 | A | 4/1997 | Easter et al. |
| 5,768,119 | A | 6/1998 | Havekost et al. |
| 5,892,440 | A | 4/1999 | Bryan |
| 6,356,282 | B2 | 3/2002 | Roytman et al. |
| 6,437,812 | B1 | 8/2002 | Giles et al. |
| 6,535,122 | B1 | 3/2003 | Bristol |
| 6,690,274 | B1 | 2/2004 | Bristol |
| 6,774,786 | B1 | 8/2004 | Havekost et al. |
| 6,845,336 | B2 | 1/2005 | Kodukula et al. |
| 7,000,193 | B1 | 2/2006 | Impink, Jr. et al. |
| 7,250,856 | B2 | 7/2007 | Havekost et al. |
| 7,352,279 | B2 | 4/2008 | Yu et al. |
| 7,388,482 | B2 | 6/2008 | Dousson et al. |
| 7,428,300 | B1 | 9/2008 | Drew et al. |
| 7,496,591 | B2 | 2/2009 | Mets et al. |
| 7,679,504 | B2 | 3/2010 | Wang et al. |
| 7,945,817 | B1 | 5/2011 | Usery et al. |
| 7,961,087 | B2 | 6/2011 | Hoveida |
| 2001/0019328 | A1 | 9/2001 | Schwuttke et al. |
| 2002/0012011 | A1 | 1/2002 | Roytman et al. |
| 2002/0099786 | A1 | 7/2002 | Chun |
| 2002/0174083 | A1 | 11/2002 | Hellerstein et al. |
| 2002/0186261 | A1* | 12/2002 | Giles et al. ............... 345/853 |
| 2004/0176926 | A1* | 9/2004 | Edie et al. ............... 702/179 |
| 2005/0062598 | A1 | 3/2005 | Akamatsu et al. |
| 2005/0197806 | A1 | 9/2005 | Eryurek et al. |
| 2005/0235356 | A1 | 10/2005 | Wang |
| 2006/0106797 | A1 | 5/2006 | Srinivasa et al. |
| 2007/0008099 | A1 | 1/2007 | Kimmel et al. |
| 2007/0033632 | A1* | 2/2007 | Baynger et al. ............ 725/135 |
| 2007/0194920 | A1 | 8/2007 | Hollifield |
| 2007/0211079 | A1 | 9/2007 | Nixon et al. |
| 2007/0268122 | A1* | 11/2007 | Kow et al. ............... 340/525 |
| 2008/0165151 | A1* | 7/2008 | Lemay et al. ............ 345/173 |
| 2009/0006903 | A1 | 1/2009 | Devitt et al. |
| 2009/0109860 | A1 | 4/2009 | Cinato et al. |
| 2010/0156654 | A1* | 6/2010 | Bullemer et al. .......... 340/691.6 |
| 2013/0002697 | A1 | 1/2013 | Ashley et al. |

FOREIGN PATENT DOCUMENTS

| | | |
|---|---|---|
| GB | 2 275 564 A | 8/1994 |
| GB | 2 372 365 A | 8/2002 |
| GB | 2 395 831 A | 6/2004 |
| GB | 2 412 449 A | 9/2005 |
| GB | 2 419 723 A | 5/2006 |
| GB | 2 426 355 A | 11/2006 |
| JP | 6242169 | 9/1994 |
| JP | 2004-192543 | 7/2004 |
| KR | 10-2010-0043507 | 4/2010 |
| WO | WO 2005/067403 A2 | 7/2005 |
| WO | WO 2005/109126 A1 | 11/2005 |
| WO | WO 2006/000110 A1 | 1/2006 |
| WO | WO 2006/058090 A2 | 6/2006 |
| WO | WO 2013/003165 A2 | 1/2013 |

OTHER PUBLICATIONS

Frost and Sullivan, "Analyzing Alarm and Trend Data", Jun. 2008, Schneider Electric, http://www.schneider-electric.co.uk/documents/solutions/process-automation/plantstruxure/WP%20Analyzing%20Alarm%20and%20Trend%20data.PDF.*
M. Klemettinen et al., "Interactive exploration of interesting findings in the Telecommunication Network Alarm Sequence Analyzer TASA", Information and Software Technology 41, 1999, p. 557-567.
Sandra de Amo, et al., "First-Order Temporal Pattern Mining with Regular Expression Constraints", 2007, 15 pages.
Qingguo Zheng, et al., "Intelligent Search of Correlated Alarms for GSM Networks with Model-based Constraints", 2002, 8 pages.
Mika Klemettinen, et al., "Rule Discovery in Telecommunication Alarm Data", Journal of Network and Systems Managament, vol. 7, No. 4, 1999, p. 395-423.
Steve Litt, "Steve Litt's PERLs of Wisdom: PERL Regular Expressions (With Snippets)", 2003, 8 pages.
Neville A. Stanton, et al., "Alarm-initiated activities: an analysis of alarm handling by operators using text-based alarm systems in supervisory control systems", Ergonomics, 1995, vol. 38, No. 11, p. 2414-2431.
Jon Kvalem, et al., "The Simulator-Based Heiden Man-Machine Laboratory (HAMMLAB) and Its Application in Human Factor Studies", OECD Heiden Reactor Project, Institute for Energy Technology, Norway, 2000, 7 pages.
Experion Operator's Guide, Release 300, Honeywell International Inc., Jun. 2006, 183 pages.
Peter Gordon, et al., "Alarm Presentation System", Westinghouse Electric Company LLC, 2007, 23 pages.
Jamie Errington, et al., "ASM Consortium Guidelines, Effective Alarm Management Practices", Version 5.02, May 8, 2007, 130 pages.
Peter Bullemer, et al., "ASM Consortium Technical Report, Addressing Alarm Flood Situations: Stage 2 Experimental Design", Jan. 22, 2008, Version 1.02, 51 pages.
Peter Bullemer, et al., "ASM Consortium Technical Report, Addressing Alarm Flood Situations: Operator Interface Design Considerations", May 1, 2007, Version 1.00, 31 pages.
Peter Bullemer, et al., "ASM Consortium Guidelines, Effective Operations Practices", May 22, 2008, Version 5.00, 128 pages.
W.S. Brown, et al., "Advanced Alarm Systems: Revision of Guidance and Its Technical Basis", Brookhaven National Laboratory, Nov. 2000, 135 pages.
E.H. Bristol, "Improved process control alarm operation", ISA Transactions 40 (2001), p. 191-205.
Jan Tuszynski, et al., "A Pilot Project on Alarm Reduction and Presentation Based on Multilevel Flow Models", Proceedings of the Enlarged Halden Programme Group Meeting, 2002, 12 pages.
ASM Consortium QRM, Alarm Tread Development Update, Honeywell International Inc., Jun. 2010, 20 pages.
Heikke Mannila, et al., "Discovery of Frequent Episodes in Event Sequences", Data Mining and Knowledge Discovery 1, 1997, p. 259-289.
Karen Haigh, et al., "Machine Learning for Alarm System Performance Analysis", ASM Consortium, 2000, 4 pages.
Bill Hollifield, et al. "The Alarm Management Handbook, A comprehensive Guide", 2006, 11 pages.
International Search Report dated Dec. 27, 2012 in connection with International Application No. PCT/US2012/043425, 5 pages.
Written Opinion of International Searching Authority dated Dec. 27, 2012 in connection with International Application No. PCT/US2012/043425, 4 pages.
Extended European Search Report dated May 22, 2015 in connection with European Patent Application No. 12804871.7; 7 pages.
Non-Final Office Action dated Jul. 30, 2015 in connection with U.S. Appl. No. 12/634,425; 27 pages.
Winer, E.; "Vienna Sampler Software: The AWE 64's Well-Kept Secret"; retrieved from wayback.archive.org/web/20101217011322/http://ethanwiner.com/vienna.html; Aug. 15, 2015; 8 pages.

* cited by examiner

HISTORICAL ALARM ANALYSIS APPARATUS AND METHOD

TECHNICAL FIELD

This disclosure is generally directed to alarming systems. More specifically, this disclosure is directed to a historical alarm analysis apparatus and method.

BACKGROUND

Supervisory control and data acquisition (SCADA) systems and Distributed control systems (ICSs) are control system that may be collectively referred to as industrial control systems (ICSs). SCADAs generally refer to computing systems that monitor and control industrial, infrastructure, or facility-based processes. Distributed control systems (DCSs) generally refer to those systems that control dynamically changing processes, such as manufacturing processes, in a distributed manner. Controller elements of a typical ICS may communicate with one another through a network and, in some cases, may be organized in a hierarchal manner so that the overall functionality of the dynamic system is controlled in a coordinated manner. ICSs may be well suited for controlling the operation of dynamic processes, such as chemical plants or oil refineries, due to the relatively large geographic areas that these dynamic processes may encompass.

ICSs often include an alarm sub-system used to alert operators of malfunctions that occur and to provide indications of certain changes in the operation of the dynamic processes. In many cases, an alarm sub-system provides alarm indicators to operators in real-time so that malfunctions in certain process elements may be resolved in a timely manner. Alarms may be categorized according to their level of criticality to proper operation of a dynamic process. For example, a typical alarm sub-system may categorize alarms into low, high, or urgent categories. Those alarms that generally cause operation of the dynamic process to cease functioning properly may be categorized as urgent, while those alarms having a moderate or minimal impact upon proper operation of the dynamic process may be categorized as high and low, respectively.

SUMMARY

This disclosure provides a historical alarm analysis apparatus and method.

In a first embodiment, a method includes partitioning alarms into two or more alarm groups. The alarms are associated with operation of an industrial process system performing a process, and each alarm has multiple states. The method also includes generating a graphical display for presentation to a user. The graphical display identifies at least one of the alarm groups and multiple alarm indicators. Each alarm indicator indicates a state transition of an associated alarm between two of the alarm's states. The alarm indicators are arranged in the graphical display based on times of their respective state transitions.

In a second embodiment, an apparatus includes at least one memory unit configured to store information identifying alarms associated with operation of an industrial process system that is configured to perform a process. Each alarm has multiple states. The apparatus also includes at least one processing unit configured to partition the alarms into two or more alarm groups and generate a graphical display for presentation to a user. The graphical display identifies at least one of the alarm groups and multiple alarm indicators. Each alarm indicator indicates a state transition of an associated alarm between two of the alarm's states. The alarm indicators are arranged in the graphical display based on times of their respective state transitions.

In a third embodiment, a computer readable medium embodies a computer program. The computer program includes computer readable program code for partitioning alarms into two or more alarm groups. The alarms are associated with operation of an industrial process system configured to perform a process, and each alarm has multiple states. The computer program also includes computer readable program code for generating a graphical display for presentation to a user. The graphical display identifies at least one of the alarm groups and multiple alarm indicators. Each alarm indicator indicates a state transition of an associated alarm between two of the alarm's states. The alarm indicators are arranged in the graphical display based on times of their respective state transitions.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
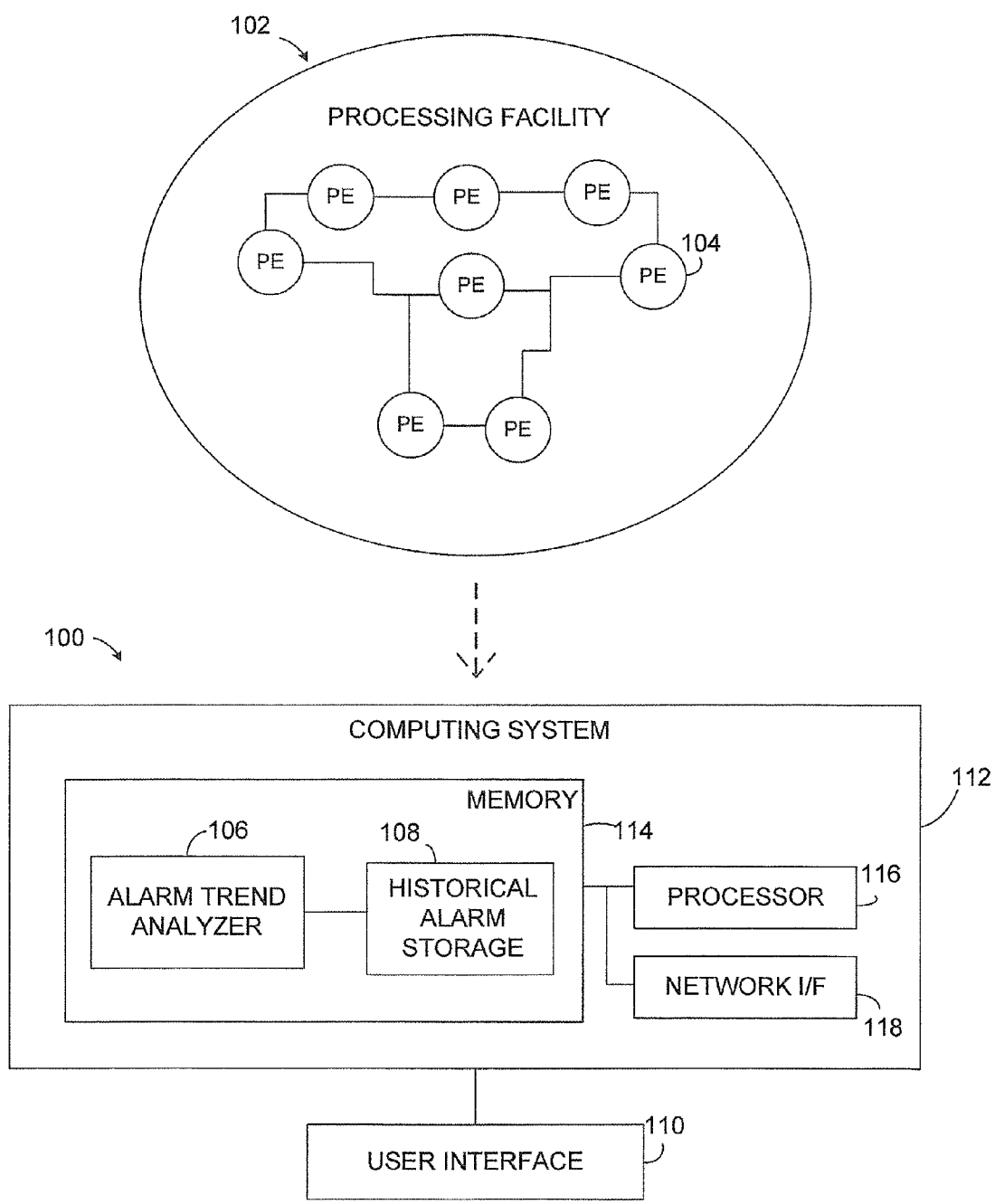
FIG. 1 illustrates an example industrial control system (ICS) according to this disclosure.

FIG. 1 illustrates an example industrial control system (ICS) 100 according to this disclosure. As shown in FIG. 1, the ICS 100 controls operation of a processing facility 102 that performs a dynamic process. The processing facility 102 includes one or more processing elements (PEs) 104 that function together to perform the dynamic process. The ICS 100 includes an alarm trend analyzer 106, which processes alarms related to the processing facility 102. Alarms processed by the analyzer 106 may be stored in a historical alarm storage 108 for analysis at a future point in time.

The processing facility 102 includes any suitable structures or combination of structures for performing a dynamic industrial process. An industrial process represents any system or portion thereof configured to produce or process one or more materials in some manner. In some embodiments, the processing facility 102 may include a chemical processing facility that produces one or more chemical products or an oil refinery that produces motor oil, kerosene, fuel, or other oil-based products. As such, the processing elements 104 include any suitable structures that perform some useful transformation or other function in the processing facility 102. Examples of processing elements 104 may include heaters, holding tanks, valves, catalytic converters, mixers, separators, reactors, compressors, pumps, expanders, distillation units, surge tanks, accumulators, relief valves, absorbers, filters, and heat exchangers (including cross-flow exchangers, plate-fin exchangers, and shell-tube exchangers).

Various processing elements 104 may malfunction from time to time due to various reasons. To assist operators of the ICS 100, the analyzer 106 may generate alarms to notify the operators of malfunctions or other deviations in the operation of one or more processing elements 104. The alarms may be generated based on data from sensors or other data sources. For example, sensors may include temperature or pressure transducing devices that generate signals representing the temperature or pressure, respectively, of a holding vessel. The analyzer 106 may be configured to compare received signals representing the temperature or pressure of the holding vessel and generate an alarm in the event that the received signals exceed predetermined limits. Note, however, that the analyzer 106 need not be configured to generate alarms itself. For instance, other components of the ICS 100 or components of the processing facility 102 could generate alarms, which can then be provided to the analyzer 106.

Alarms associated with the processing facility 102 may be categorized by the analyzer 106, such as into different criticality levels based on their severity. In some embodiments, alarms are categorized into one of three criticality levels: low priority, high priority, and urgent priority. Low priority alarms may include those representing operating characteristics of processing elements 104 that do not adversely affect the operation of the processing facility 102 in an undue manner. In some cases, low priority alarms may or may not represent malfunctions of processing elements 104. Rather, low priority alarms may merely represent notifications that one or more characteristics of a processing element 104 have deviated from a specified norm. Urgent priority alarms generally include those representing malfunctions of processing elements 104 that adversely affect operation of the processing facility 102. High priority alarms may include those alarms that represent malfunctions of processing elements 104 that are greater in severity than low priority alarms and lesser in severity than urgent priority alarms.

Alarms associated with the processing facility 102 may also be assigned to two or more states by the analyzer 106. The states indicate the condition of an alarm at any particular point in time. For example, an alarm may have an active state indicating that the alarm is in an active condition and an inactive state indicating that the alarm is in an inactive condition. In some embodiments, alarms may have other or additional states, such as an acknowledged state indicating that an active alarm has been acknowledged by an operator of the ICS 100. The acknowledged state may be useful for determining in real-time or forensically the point of time in which operators of the ICS 100 have commenced corrective action to a malfunction that caused an alarm to go into the active state.

In many cases, a processing facility 102 may employ relatively complex processes that use numerous processing elements 104. As such, a malfunction in one portion of the processing facility 102 may cause operators of the ICS 100 to become inundated with a large quantity of alarms at one time (a condition known as "alarm flooding"). When alarm floods are generated, operators may be hindered from correctly ascertaining the main source of a malfunction due to pertinent alarms being hidden among numerous other superfluous alarms.

As noted above, the analyzer 106 processes alarms associated with the processing facility 102 and stores records of these alarms in the historical alarm storage 108. The alarms may be stored in the historical alarm storage 108 along with their time of occurrence and other related data (such as start time, stop time, and operator responses). The analyzer 106 is operable to partition the alarms into two or more alarm groups and to display at least one of the alarm groups on a user interface 110 in an easy-to-read manner. For instance, the analyzer 102 can display alarms that are related to one another as independent groups on the user interface 110, providing an easier way in which historical operation of the processing facility 102 can be viewed or analyzed.

In some embodiments, the analyzer 106 may be used by personnel who maintain or design operation of the processing facility 102, such as engineers or scientists. These personnel could use the analyzer 106 to perform historical alarm analysis, such as post-incident analysis following a plant upset. In cases such as these, the life cycle of certain alarms may be extracted from the historical alarm store 108 and displayed on the user interface 110 for analysis, along with other alarms or various parametric values associated with the processing facility 102, to ascertain their interrelation with one another. Once these alarms have been identified, a continuous history of the alarms and various parametric values may be overlaid on the user interface 110 to help the user identify the root cause of the plant upset. Ease of use may be further facilitated by alternatively hiding or showing different categories of alarms such that the user interface 110 is not cluttered with superfluous information. Additionally, the analyzer 106 may highlight repeated incidents of certain alarms to identify certain trends that the alarms may undergo during operation of the processing facility 102.

Each alarm group into which the alarms may be partitioned generally defines a cluster of alarms that may be related to one another. Alarms may be more related to certain alarms than to other alarms. The alarms relation to one another may be based upon any criteria, such as their causal relation to one another and/or their relative time of occurrence. For example, a particular alarm may be related to one or more other alarms because the other alarms may pose a causal effect upon the particular alarm. As another example, the processing facility 102 may include several sub-processes in which each sub-process may be monitored by a certain group of alarms. In either case, historical or forensic analysis of the operation of the processing facility 102 may be eased by grouping related alarms with one another. In this manner, users of the analyzer 106 may determine the underlying causes of conditions that caused the alarms by analyzing groups of related alarms with one another.

Grouping certain alarms with one another may also provide a time-based presentation of these alarms such that users may analyze the alarms according to their time of occurrence relative to one another. For example, a particular alarm may be generated according to one of several possible faults in a processing facility 102. Analysis of this alarm along with the timing of other alarms may be useful for identifying the type and nature of the fault that caused the alarm to be generated.

The analyzer 106 includes any suitable structure for analyzing historical alarms of a processing facility. For example, the analyzer 106 could be implemented using hardware only or a combination of hardware and software/firmware instructions. In this example, the analyzer 106 is implemented using a computing system 112 that includes at least one memory unit 114, at least one processing unit 116, and at least one network interface 118. The at least one memory unit 114 includes any suitable volatile and/or non-volatile storage and retrieval device(s), such as a hard disk, an optical storage disc, RAM, or ROM. The at least one processing unit 116 includes any suitable processing structure(s), such as a microprocessor, microcontroller, digital signal processor, application specific integrated circuit, or field programmable gate array. The at least one network interface 118 includes any suitable structure(s) for communicating over one or more networks, such as a wired Ethernet interface or a wireless interface. This represents one specific way in which the analyzer 106 can be implemented, and other implementations of the analyzer 106 could be used. When implemented using software and/or firmware, the analyzer 106 may include any suitable program instructions that simulate one or more processes of the facility 102. In some embodiments, the analyzer 106 may be implemented using the EXPERION PKS DCS software application from HONEYWELL INTERNATIONAL SÀRL.

The user interface 110 can be used to interact with the analyzer 106, such as to initiate analysis and view analysis results or alarms. The user interface 110 includes any suitable structure for providing information to a user and receiving information from the user. For example, the user interface 110 could represent a display device.

Although FIG. 1 illustrates one example of a ICS 100, various changes may be made to FIG. 1. For example, the ICS 100 could include any number of analyzers 106 and computing systems 112, and the ICS 100 could be used with any number of user interfaces 110. Also, the functional division shown in FIG. 1 is for illustration only. Various components in FIG. 1 could be combined, further subdivided, or omitted and additional components could be added according to particular needs. For instance, the analyzer 106 could form an integral part of the ICS 100, or the analyzer 106 could be implemented as a stand-alone application that may be executed independently of the ICS 100. In addition, the processing facility 102 could have any suitable structure with any number and arrangement of processing elements 104.

Figure 2:
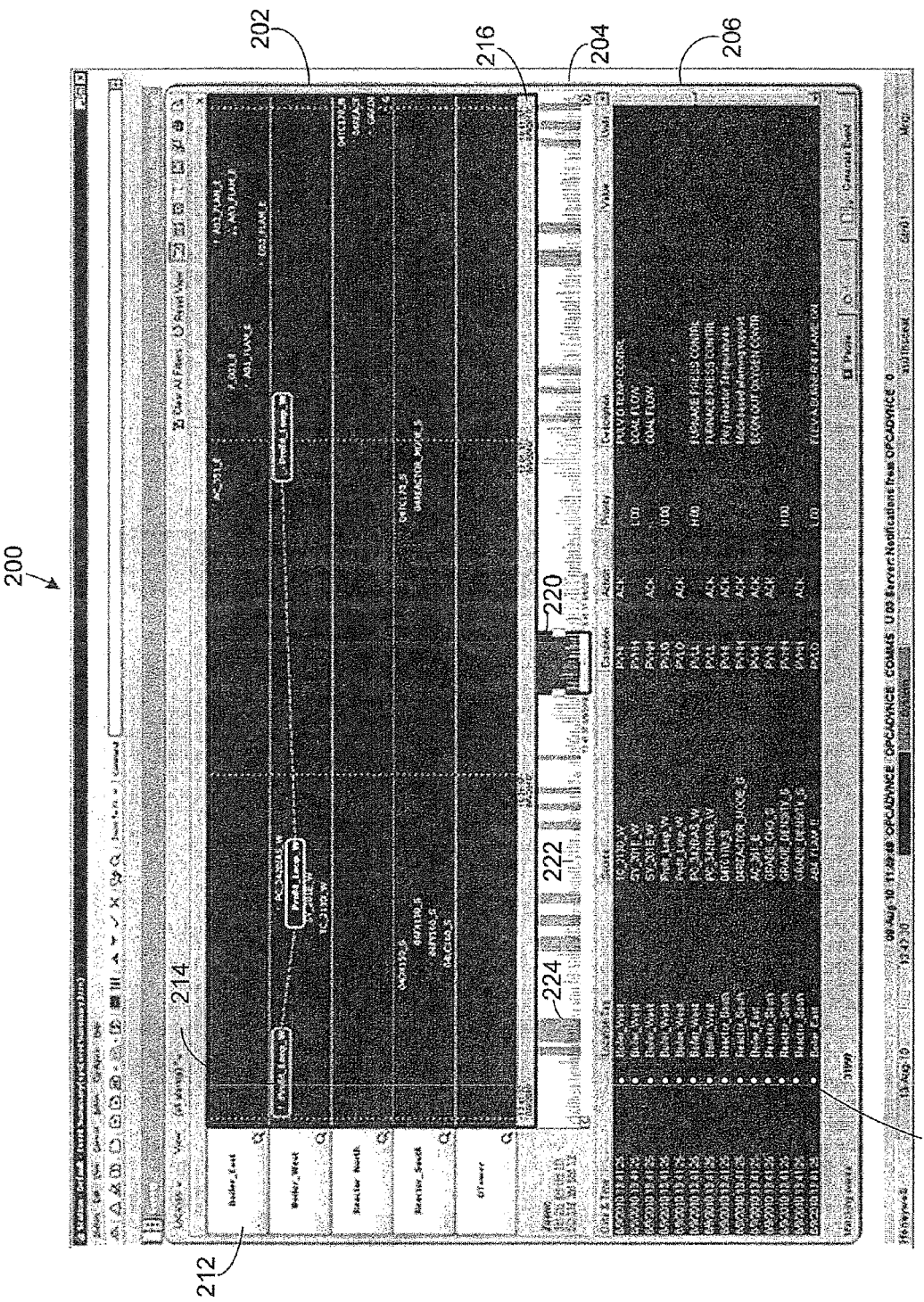
FIG. 2 illustrates an example graphical display for presenting one or more alarm groups according to this disclosure.

FIG. 2 illustrates an example graphical display 200 for presenting one or more alarm groups according to this disclosure. The graphical display 200 could, for example, be presented by the analyzer 106 on the user interface 110 of FIG. 1. In this example, the graphical display 200 includes an alarm trend pane 202, a history overview pane 204, and an alarm list pane 206 arranged as shown in FIG. 2. Various components of the graphical display 200 may function together to allow a user to investigate time periods of interest while maintaining overall situational awareness of the operation of a processing facility 102 during an extended period of time.

The alarm list pane 206 includes a list of alarm records received from the historical alarm storage 108. In particular, the alarm list pane 206 displays alarms that were in the active or inactive state at some point during the period of time identified in the history overview pane 204. In this example, the alarm list pane 206 includes multiple rows, each row corresponding to one alarm state transition associated with the processing facility 102. The alarm list pane 206 also includes several columns that display various types of information related to the alarms, such as date and time of occurrence, a location tag associated with the alarm, the source of the alarm, the condition associated with the alarm, an action associated with the alarm, a priority associated with the alarm, and a textual description of the alarm.

Each row of the alarm list pane 206 may include an alarm state icon 210 showing the state of its respective alarm during the period of time displayed in the alarm trend pane 202. The alarm state icon 210 may include any suitable type of visual indication of an alarm state. For example, the alarm state icon 210 may be displayed in a green color to indicate that the alarm is in the inactive state, a yellow color to indicate that the alarm is in the active and acknowledged state, and a red color to indicate that the alarm is in the active state and unacknowledged. In some embodiments, an alarm state icon 210 may be displayed in a flashing manner if its respective alarm is in the active and unacknowledged state.

The alarm trend pane 202 includes one or more rows corresponding to one or more alarm groups 212. Each alarm group 212 includes one or more alarm indicators 214. Each alarm indicator 214 represents a state transition of a particular alarm from one state to another, such as from the inactive state to the active state or vice versa. The alarm trend pane 202 further includes a timeline 216 extending across the bottom edge of the alarm trend pane 202. The timeline 216 indicates a historical elapsed period of time in which time progresses from the left side to the right side of the alarm trend pane 202. Thus, the alarm indicators 214 may be displayed according to their time of occurrence by horizontal placement across the timeline 216.

Individual alarm indicators 214 in the alarm trend pane 202 may be selected by a user in any suitable manner, such as by using an input device like a mouse. When one particular alarm indicator 214 has been selected, all alarm indicators 214 associated with that particular alarm may be highlighted in the pane 202. In addition, a line may be displayed from a first alarm indicator 214 indicating a state change into the active state to a second alarm indicator 214 indicating a state change into the inactive state. For cases where the alarm includes other states (such as an acknowledged state), additional lines may be displayed connecting to alarm indicators 214 associated with these other states. With this feature, users of the analyzer 106 may be able to quickly ascertain the full duration of the active state of any alarm and the condition of other alarms that may be related to the highlighted alarm during this period of time.

The history overview pane 204 generally displays an expanded timeline of that displayed by alarm trend pane 202. For example, while the alarm trend pane 202 may display a timeline 216 that extends over a two-hour period, the history overview pane 204 may display a window of time that extends over a 24-hour period. The history overview pane 204 includes a shaded region 220 indicating the window of time that is currently displayed in the alarm trend pane 202 and that defines the alarms presented in the alarm list pane 206.

The history overview pane 204 includes bars 222 that are displayed at repeating intervals. Each bar 222 indicates the quantity of alarms that are in an active state at the bar's associated point in time. The history overview pane 204 also includes one or more secondary shaded regions 224 indicating elapsed periods of time in which an alarm selected in the alarm trend pane 202 is active over the time period displayed in the history overview pane 204. Although the elapsed periods are represented as shaded regions 224, any form of indicia that provides a visual indication of the elapsed periods may be used. For example, the elapsed periods may be represented by regions of differing colors, flashing patterns, or cross-hatching patterns that indicate the breadth and overall amount of time in which a highlighted alarm was active.

In some embodiments, the secondary shaded regions 224 provide users of the analyzer 106 with a visual indication of certain useful characteristics of a particular alarm over a period of time. For example, the secondary shaded regions 224 may show the rate of alarm generation to assist users in zeroing in on the time periods of interest. That is, a user analyzing a particular alarm may highlight that particular alarm and view the times when that alarm was active in the history overview pane 204. The user may then select a particular smaller window of time to be displayed in the alarm trend pane 202 so that the alarm's activity may be compared with other related alarms.

In some embodiments, the alarm trend pane 202 may be expanded or contracted to display any elapsed period of time relative to the history overview pane 204. In the particular example graphical display 200 shown in FIG. 2, the alarm trend pane 202 may be expanded or contracted by adjusting the breadth of the shaded region 220 via selection and movement techniques, such as by using a mouse or a scroll-ball device. In other embodiments, the alarm trend pane 202 may be scrolled forward or backward in time relative to the history overview pane 204.

Figure 3:
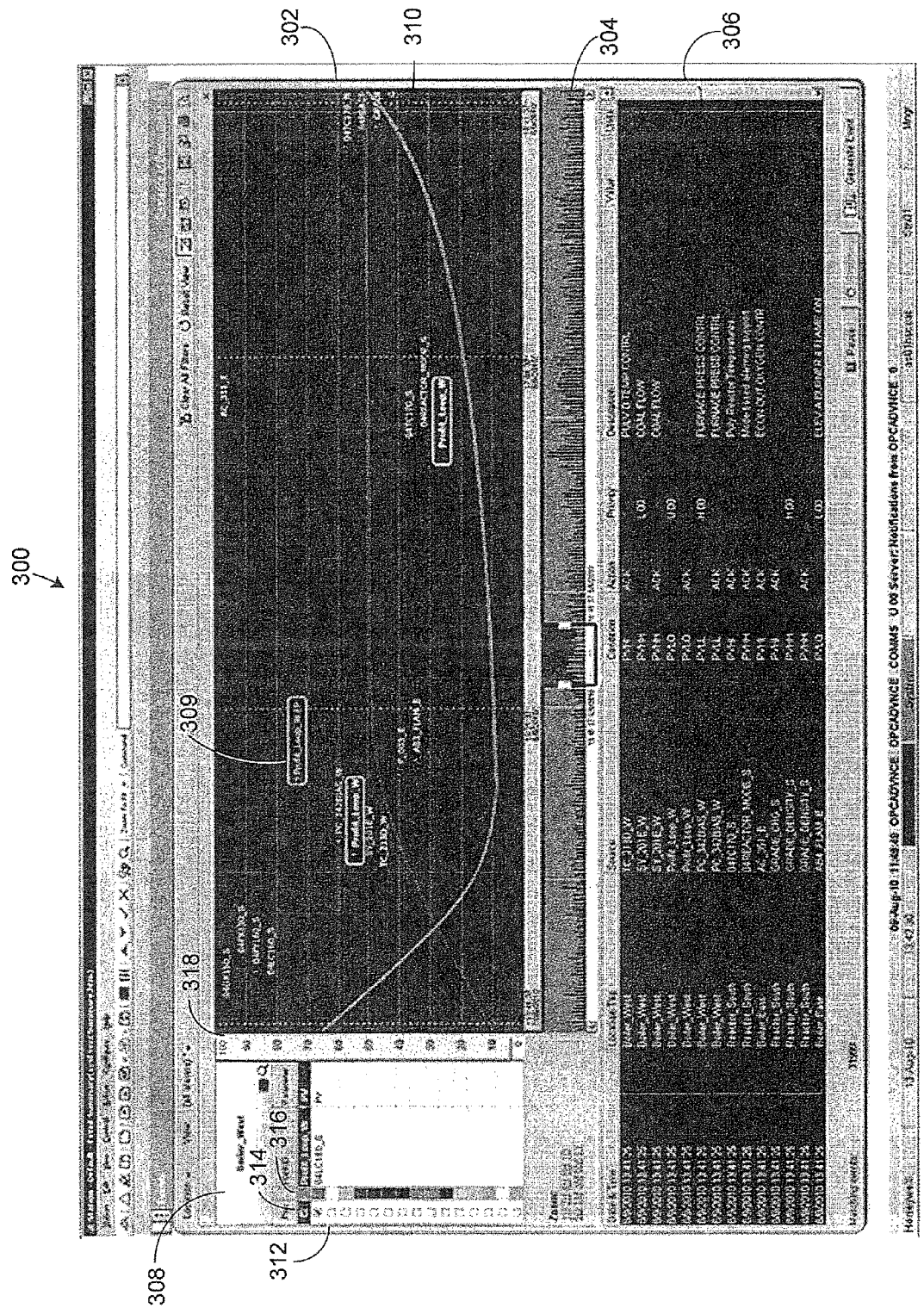
FIG. 3 illustrates another example graphical display for presenting one or more alarm groups according to this disclosure.

FIG. 3 illustrates another example graphical display 300 for presenting one or more alarm groups according to this disclosure. The graphical display 300 could, for example, be presented by the analyzer 106 on the user interface 110 of FIG. 1. In this example, the graphical display 300 includes an alarm trend pane 302, a history overview pane 304, an alarm list pane 306, and a parametric value selection pane 308. The history overview pane 304 and the alarm list pane 306 may function similarly to the history overview pane 204 and alarm list pane 206, respectively, of FIG. 2.

The alarm trend pane 302 functions similarly to the alarm trend 202 of FIG. 2, with a few exceptions. Whereas the alarm trend pane 202 of FIG. 2 displays five alarm groups, the alarm trend pane 302 displays only one alarm group. Note, however, that the alarm trend pane 202 or 302 may be selectively modified by a user to display any quantity of alarm groups in the alarm trend pane 202 or 302. The alarm trend pane 302 also differs from the alarm trend pane 202 in that it displays alarm indicators 309 and curves 310, where the curves 310 represent parametric values associated with the processing facility 102. The parametric values and their associated curves 310 are described in more detail below.

The parametric value selection pane 308 displays a list 312 of parametric values of the processing facility 102. The parametric values denote values received from sensors or other devices and stored in the memory 114. Parametric values may represent any process variable that affects or is affected by operation of the processing facility 102. Suitable types of process variables may include pressure, temperature, or chemical composition of a constituent material stored in a holding tank or other containment vessel.

The list 312 of parametric values is displayed in rows, where each row includes a selection button 314 and a display color selection button 316. Activation of selection button 314 causes the respective parametric value to be displayed in the alarm trend pane 302 as a curve 310. The alarm trend pane 302 may also include a vertical gauge 318 displaying graduated or other values that the curve 310 represents. The color selection button 316 associated with each parametric value may be used to select the color in which the curve 310 is displayed in the alarm trend pane 302.

In many cases, knowledge of the values of certain process variables may be useful for performing historical analysis of the operation of the processing facility 102 in conjunction with alarm indicators displayed in the alarm trend pane 302. For example, a scenario may have occurred in which a pump used to pump material into a mixer has failed. Historical analysis of the pump's vibration level and electrical power draw characteristics may indicate that the pump has been operating properly during and just prior to the pump's failure. However, upon analysis of the chemical composition of material that was flowing through the pump using an appropriate parametric value displayed on a curve 310 in the alarm trend pane 302, it may be determined that certain constituent components of the material caused pressure levels in the mixer to become elevated, causing excessive pressure levels at the output port of the pump. Thus, displaying curves 310 of parametric values may aid in historical analysis to quickly determine the causes and effects of these parameters upon operation of the processing facility 102.

Although FIGS. 2 and 3 illustrate examples of graphical display for presenting one or more alarm groups, various changes may be made to FIGS. 2 and 3. For example, the graphical displays 200 and 300 may include any other or additional panes. As a particular example, the graphical display 200 or 300 may be void of the history overview pane, the alarm list pane, and/or the parametric value selection pane. As another particular example, the alarm trend pane may include a timeline bar that extends vertically such that time may progress upwardly or downwardly across the display. In addition, the arrangement and composition of the graphical displays are for illustration only. Any of a wide variety of information in any suitable format could be presented, and any suitable input/output mechanisms could be used to obtain information from and provide information to a user.

Figure 4:
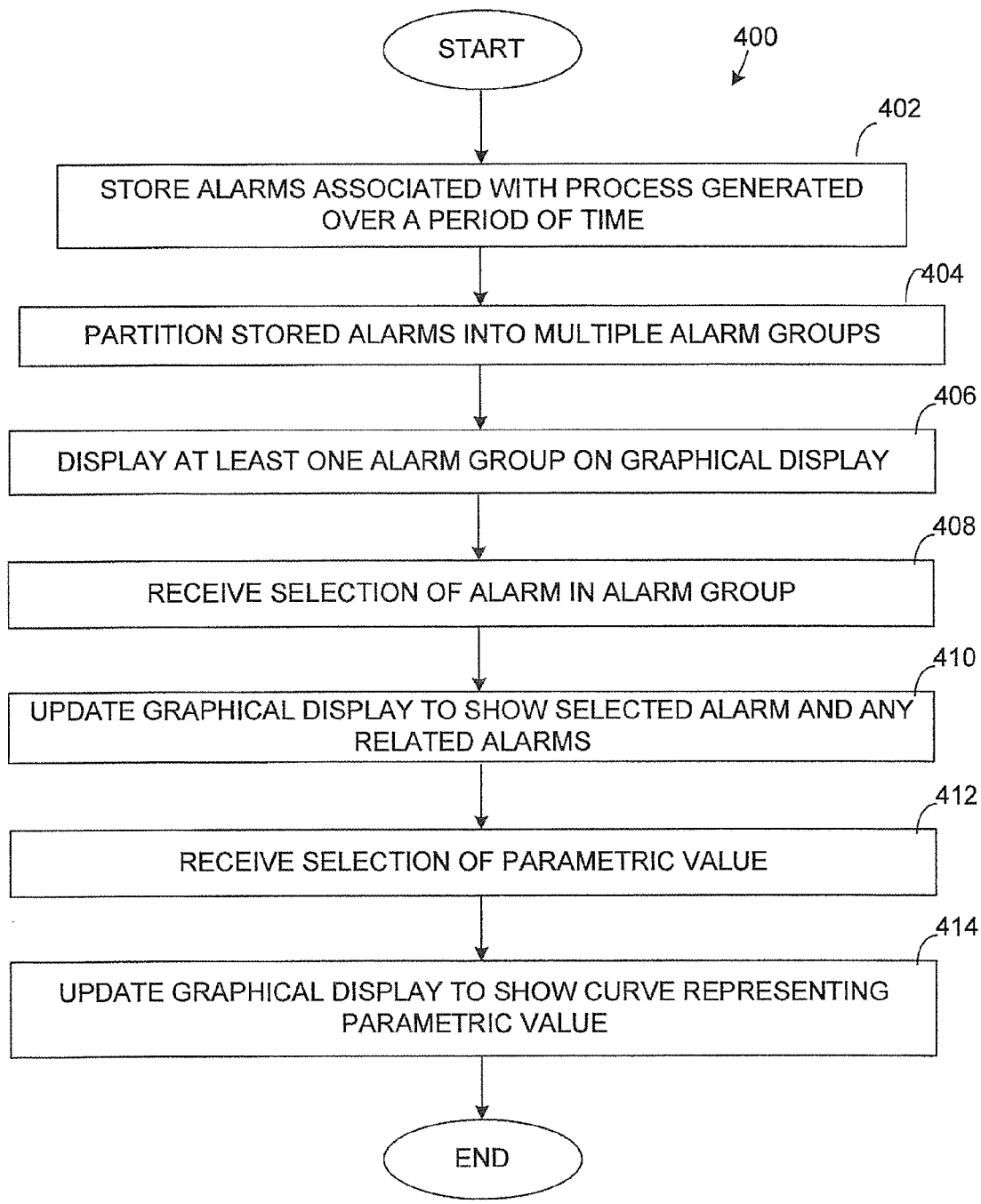
FIG. 4 illustrates an example method for historical analysis of alarms associated with a processing facility according to this disclosure.

FIG. 4 illustrates an example method 400 for historical analysis of alarms associated with a processing facility according to this disclosure. As shown in FIG. 4, the analyzer 106 stores alarms that have been generated by a processing facility over a period of time at step 402. This could include, for example, the analyzer 106 continually monitoring operation of the processing facility 102 and storing alarms as they are generated. The period of time may include any duration for which future analysis may be desired. In many cases, processing facilities 102 may operate on a continual basis, and the analyzer 106 may continually store alarms so that historical analysis of the alarms may be performed over any desired period of time.

The analyzer 106 partitions the stored alarms into multiple alarm groups at step 404. The stored alarms may be partitioned according to any desired criteria. For example, certain alarms may be grouped together according to their causes and/or effects upon one another. That is, certain alarms whose condition may cause other alarms to go active may be grouped together. As another example, a processing facility 102 may be formed of multiple sub-processes that function together. In this case, alarms may be grouped according to each sub-process so that historical analysis of alarms may be performed on a sub-process basis.

The analyzer 106 displays the alarm groups in a graphical display at step 406. The analyzer 106 may display all alarm groups simultaneously, a portion of all alarm groups simultaneously, or only one alarm group at a time on the graphical display. The particular display technique used here could be a user selectable parameter. The displayed alarm groups may include alarm indicators representing a state transition of a particular alarm from one state to another. For instance, one alarm indicator may be associated with an alarm that has transitioned from the inactive to the active state, while another alarm indicator may be associated with the same alarm that has transitioned from the active to the inactive state. Thus, multiple alarm indicators may be associated with a single alarm. The alarm indicators may also be arranged in any suitable manner, such as linearly with respect to time. A timeline may be oriented in any suitable direction, such as horizontally.

A selection of an alarm in an alarm group is received at step 408, and the graphical display is updated to show the selected alarm and any related alarms at step 410. This could include, for example, the analyzer 106 receiving a selection of an alarm indicator, highlighting the selected alarm indicator, and highlighting any alarm indicator associated with the same alarm.

A selection of at least one parametric value is received at step 412, and the graphical display is updated to show at least one curve for the parametric value(s) at step 414. A parametric value could represent any suitable variable associated with the processing facility 102. The curve(s) may be overlaid on the same display in which the alarm indicators are displayed so that instantaneous parametric values may be viewed along with the alarm indicators at their time of occurrence.

Although FIG. 4 illustrates one example of a method 400 for historical analysis of alarms associated with a processing facility, various changes may be made to FIG. 4. For example, the analyzer 106 may receive input through a user interface to interactively display any number and type of alarm groups and/or parametric values on the graphical display. Also, the analyzer 106 may receive input through the user interface to adjust time windows to include any historical elapsed period of time for which analysis of alarms may be desired. For instance, the time window through which alarm indicators and/or parametric values are displayed may be adjusted forwards or backwards in time and expanded or contracted to include a longer or shorter period of time. In addition, while shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   partitioning alarms into two or more alarm groups, the alarms associated with operation of an industrial process system performing a process, each alarm having multiple states; and
   generating a graphical display for presentation to a user, wherein the graphical display identifies at least one of the alarm groups and multiple alarm indicators, each alarm indicator indicating a state transition of an associated alarm between two of the alarm's states, the alarm indicators arranged in the graphical display based on times of their respective state transitions,
   wherein generating the graphical display comprises arranging the alarm indicators linearly along a first timeline representing a first historical elapsed period of time and overlaying a continuous history of the at least one of the alarm groups along the first timeline,
   wherein the graphical display further comprises a second timeline representing a second historical elapsed period of time that encompasses and is longer in duration than the first historical elapsed period of time,
   wherein the alarm indicators are selected for arrangement along the first timeline based on a selection of a time period within the second timeline, the first historical elapsed period of time matching the selection of the time period within the second timeline,
   wherein the second timeline includes a first indicator identifying the first historical elapsed period of time that is displayed in the first timeline, the first indicator configured to scroll across the second timeline to change the first historical elapsed period of time that is displayed in the first timeline, the first indicator configured to expand and contract to adjust a length of the first historical period of time that is displayed in the first timeline,
   wherein the second timeline also includes one or more second indicators identifying a duration in the second timeline of an active state for a selected alarm indicator occurring either outside or within a scope of the first indicator, and
   wherein the graphical display further comprises third indicators within the second timeline, the third indicators identifying a number of active alarms at different times along the second timeline occurring either outside or within the scope of the first indicator, the second and third indicators being visible within the first indicator.

2. The method of claim 1, further comprising:
   receiving a selection of one of the alarm indicators; and
   in response to the selection, highlighting any alarm indicators related to the selected alarm indicator.

3. The method of claim 2, wherein the selected alarm indicator represents a first state transition of a particular alarm,
   wherein highlighting any alarm indicators related to the selected alarm indicator comprises highlighting at least one alarm indicator associated with the particular alarm, and
   wherein the at least one highlighted alarm indicator represents at least one additional state transition of the particular alarm.

4. The method of claim 1, wherein the continuous history further comprises one or more curves representing one or more parametric values associated with the industrial process system.

5. The method of claim 4, wherein the one or more curves are displayed in the graphical display in a same pane as the alarm indicators.

6. The method of claim 1, wherein the alarm indicators are arranged linearly with respect to time along the first timeline, and wherein the second timeline includes quantity indicators arranged linearly with respect to time along the second timeline, each quantity indicator indicating a quantity of alarms in an active state at a point in time associated with the quantity indicator.

7. The method of claim 1, wherein the second indicators show a rate of alarm generation.

8. An apparatus, comprising:
- at least one memory unit configured to store information identifying alarms associated with operation of an industrial process system that is configured to perform a process, each alarm having multiple states; and
- at least one processing unit configured to:
  - partition the alarms into two or more alarm groups; and
  - generate a graphical display for presentation to a user, wherein the graphical display identifies at least one of the alarm groups and multiple alarm indicators, each alarm indicator indicating a state transition of an associated alarm between two of the alarm's states, the alarm indicators arranged in the graphical display based on times of their respective state transitions, wherein the graphical display includes the indicators arranged linearly along a first timeline representing a first historical elapsed period of time and an overlay of a continuous history of the at least one of the alarm groups along the first timeline, wherein the graphical display further comprises a second timeline representing a second historical elapsed period of time that encompasses and is longer in duration than the first historical elapsed period of time, wherein the at least one processing unit is configured to select the alarm indicators for arrangement along the first timeline based on a selection of a time period within the second timeline, the first historical elapsed period of time matching the selection of the time period within the second timeline, wherein the second timeline includes a first indicator configured to identify the first historical elapsed period of time that is displayed in the first timeline, the first indicator configured to scroll across the second timeline to change the first historical elapsed period of time that is displayed in the first timeline, the first indicator configured to expand and contract to adjust a length of the first historical period of time that is displayed in the first timeline, wherein the second timeline also includes one or more second indicators configured to identify a duration in the second timeline of an active state for a selected alarm indicator occurring either outside or within a scope of the first indicator, and wherein the graphical display further comprises third indicators within the second timeline, the third indicators configured to identify a number of active alarms at different times along the second timeline occurring either outside or within the scope of the first indicator, the second and third indicators being visible within the first indicator.

9. The apparatus of claim 8, wherein the at least one processing unit is further configured to:
- receive a selection of one of the alarm indicators; and
- in response to the selection, highlight any alarm indicators related to the selected alarm indicator.

10. The apparatus of claim 9, wherein the selected alarm indicator represents a first state transition of a particular alarm,
- wherein the at least one processing unit is configured to highlight at least one alarm indicator associated with the particular alarm, and
- wherein the at least one highlighted alarm indicator represents at least one additional state transition of the particular alarm.

11. The apparatus of claim 8, wherein the continuous history further comprises one or more curves representing one or more parametric values associated with the industrial process system.

12. The apparatus of claim 11, wherein the one or more curves are displayed in the graphical display in a same pane as the alarm indicators.

13. The apparatus of claim 8, wherein the second indicators show a rate of alarm generation.

14. A non-transitory computer readable medium embodying a computer program, the computer program comprising computer readable program code that when executed causes at least one processing device to:
- partition alarms into two or more alarm groups, the alarms associated with operation of an industrial process system configured to perfolin a process, each alarm having multiple states; and
- generate a graphical display for presentation to a user, wherein the graphical display identifies at least one of the alarm groups and multiple alarm indicators, each alarm indicator indicating a state transition of an associated alarm between two of the alarm's states, the alarm indicators arranged in the graphical display based on times of their respective state transitions, wherein the graphical display comprises the alarm indicators arranged linearly along a first timeline representing a first historical elapsed period of time and an overlay of a continuous history of the at least one of the alarm groups along the first timeline, wherein the graphical display further comprises a second timeline representing a second historical elapsed period of time that encompasses and is longer in duration than the first historical elapsed period of time, wherein the alarm indicators are selected for arrangement along the first timeline based on a selection of a time period within the second timeline, the first historical elapsed period of time matching the selection of the time period within the second timeline, wherein the second timeline includes a first indicator identifying the first historical elapsed period of time that is displayed in the first timeline, the first indicator configured to scroll across the second timeline to change the first historical elapsed period of time that is displayed in the first timeline, the first indicator configured to expand and contract to adjust a length of the first historical period of time that is displayed in the first timeline, wherein the second timeline also includes one or more second indicators identifying a duration in the second timeline of an active state for a selected alarm indicator occurring either outside or within a scope of the first indicator, and wherein the graphical display further comprises third indicators within the second timeline, the third indicators identifying a number of active alarms at different times along the second timeline occurring either outside or within the scope of the first indicator, the second and third indicators being visible within the first indicator.

15. The non-transitory computer readable medium of claim 14, wherein the computer program further comprises computer readable program code that when executed causes the at least one processing device to:
- receive a selection of one of the alarm indicators; and
- in response to the selection, highlight any alarm indicators related to the selected alarm indicator.

16. The non-transitory computer readable medium of claim 15, wherein the selected alarm indicator represents a first state transition of a particular alarm, wherein the computer readable program code that when executed causes the at least one processing device to highlight any alarm indicators related to the selected alarm indicator comprises computer readable program code that when executed causes the at least one processing device to highlight at least one alarm indicator associated with the particular alarm, and wherein the at least one highlighted alarm indicator represents at least one additional state transition of the particular alarm.

17. The non-transitory computer readable medium of claim 14, wherein the continuous history further comprises one or more curves representing one or more parametric values associated with the industrial process system.

18. The non-transitory computer readable medium of claim 17, wherein the one or more curves are displayed in the graphical display in a same pane as the alarm indicators.

19. The non-transitory computer readable medium of claim 14, wherein the second indicators show a rate of alarm generation.

* * * * *